Nov. 14, 1967    J. C. AHLF    3,352,568
EXTENSIBLE AND RETRACTABLE WHEEL ASSEMBLY FOR LUGGAGE
Filed Aug. 31, 1966

INVENTOR.
JOHN C. AHLF
BY
*Elliott & Pastoriza*
ATTORNEYS

United States Patent Office 3,352,568
Patented Nov. 14, 1967

3,352,568
EXTENSIBLE AND RETRACTABLE WHEEL
ASSEMBLY FOR LUGGAGE
John C. Ahlf, 626 Baylor St.,
Pacific Palisades, Calif. 90272
Filed Aug. 31, 1966, Ser. No. 576,264
2 Claims. (Cl. 280—35)

ABSTRACT OF THE DISCLOSURE

This invention relates generally to luggage, suitcases and the like, and more particularly to an extensible and retractable wheel assembly providing a convenient means for rollably supporting luggage.

---

Several arrangements have been devised for rollably supporting luggage on wheel assemblies to eliminate the necessity of carrying luggage. Many of these arrangements include relatively complex mechanisms which are costly to manufacture and also unduly increase the weight of the piece of luggage within which the mechanism is mounted. Moreover, many of the prior art wheel assemblies are bulky and require a large compartment or area in the luggage for receiving the same when in a retracted position. Accordingly, the capacity of the luggage may be greatly reduced.

Many prior art wheel assemblies are mounted within the luggage in such a manner that the means for extending and retracting the wheels are not conveniently accessible. Accordingly, the luggage must often be lifted, tilted or otherwise manipulated in order to make the operating mechanism accessible for use.

With the foregoing in mind, it is accordingly a primary object of this invention to provide an extensible and retractable wheel assembly adapted to be mounted on a piece of luggage for rollably supporting the luggage when desired, which overcomes the above problems.

More particularly, it is an object to provide a wheel assembly for luggage which is simple in construction and arranged for retraction within the luggage in a compact manner, with the result that the retracted assembly requires little space in the luggage.

Another object is to provide a wheel assembly for luggage which includes conveniently accessible means for actuating the assembly, wherein the assembly is extensible by gravity in response to operation of the conveniently positioned actuating means.

Another object is to provide a wheel assembly for luggage which, when extended for supporting the luggage, provides a completely stable support and is arranged whereby the luggage is easily steered without requiring a complex steering mechanism.

Briefly, these and many other objects and advantages of this invention are attained by providing a luggage case with partition means for dividing the case into upper and lower portions. The lower portion is designed to communicate with the exterior of the case and is adapted to receive a wheel assembly for rollably supporting the luggage case when desired.

The invention includes coupling means for pivotally coupling the wheel assembly in the lower portion of the case for permitting pivoting movement of the wheel assembly between a raised position within the lower portion and a lowered position beneath the case for supporting the same. Locking means are included in the coupling means for releasably retaining the wheel assembly in the raised position and in the lowered position.

The invention further includes a conveniently accessible means for actuating the wheel assembly for permitting the wheel assembly to pivot between the raised position and the lowered position in response to operation of the actuating means.

A better understanding of the invention will now be had by referring to a preferred embodiment thereof as illustrated in the accompanying drawings, in which.

Figure 1:
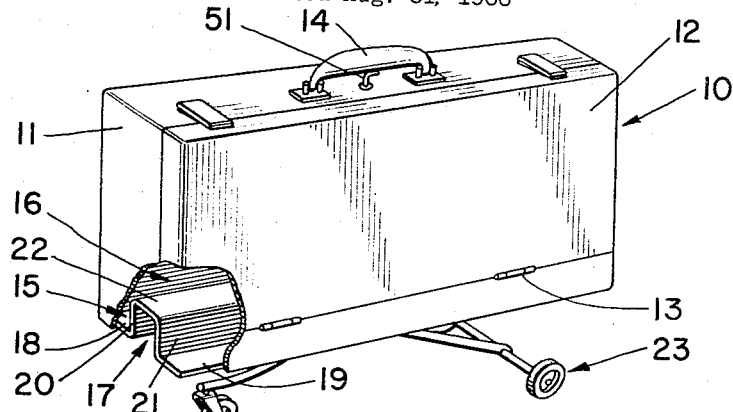
FIGURE 1 is a perspective view, partly broken away, of a luggage case and wheel assembly in accordance with the invention.

Referring first to FIGURE 1, there is shown a luggage case 10 having a body portion 11 closed by a cover or lid 12 mounted on the body portion by hinges 13. The luggage case 10 includes a carrying handle 14 mounted in the usual manner.

In accordance with the invention, the luggage case 10 includes interior partition means 15 for dividing the case into upper and lower portions 16 and 17, respectively. The partition means 15 includes first and second bottom panels 18 and 19 respectively, which are joined to a pair of spaced vertical panels 20 and 21 which extend longitudinally through the interior of the luggage case 10 as shown. A top panel 22 is positioned across the tops of the panels 18 and 19 and extends in parallel relation to the bottom panels 18 and 19. It will, of course, be appreciated that the upper portion 16 of the luggage case comprises the area within which clothing and the like is receivable within the luggage case 10.

The luggage case 10 includes a wheel assembly shown generally at 23 coupled to the case within the lower portion 17 and extending downwardly therefrom for rollably supporting the luggage case in an upright position as shown. As is apparent in FIGURE 1, the luggage case 10 may be conveniently moved and guided along a supporting surface by simply gripping the handle 14 while the wheel assembly 23 supports the weight of the luggage case.

Figure 2:
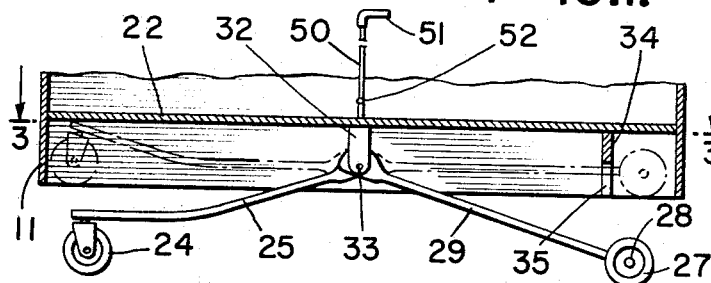
FIGURE 2 is a side elevation view, partly in cross section, of the luggage case and wheel assembly of FIGURE 1.
Figure 3:
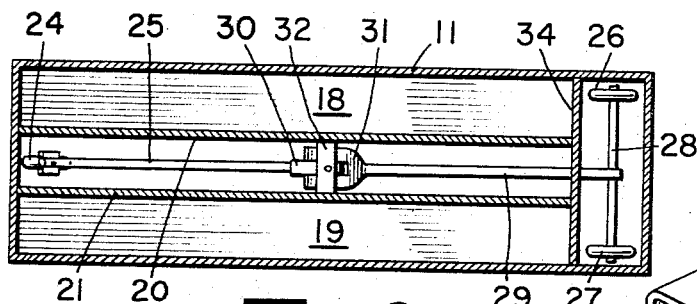
FIGURE 3 is a sectional view taken in the direction of arrows 3—3 of FIGURE 2.

Referring now to FIGURES 2 and 3, the details of the invention will be seen more clearly. The wheel assembly 23 includes a caster wheel 24 secured on the end of a first lever 25. As best shown in FIGURE 3, the wheel assembly 23 further includes a pair of wheels 26 and 27 being mounted on an axle 28 which is, in turn, coupled to the end of a second lever 29.

The levers 25 and 29 are adapted to be coupled within the lower portion 17 of the luggage case by means permitting pivoting movement of the levers in a common vertical plane. Toward that end, the lever 25 includes an enlarged end portion 30 received within a fork portion 31 of the lever 29. The end portion 30 and fork portion 31 are receivable within a U-shaped bracket 32 and are pivotally coupled thereto by a pivot pin 33.

As best shown in FIGURE 3, the bracket 32 may be secured by suitable means between the panels 20 and 21 approximately midway between the ends of the luggage case. The panels 20 and 21 extend from one end of the luggage case into connection with a cross member 34 which defines an area with the opposite end of the case 10 for receiving the wheels 26 and 27. As shown in FIG- URE 2, the cross member 34 includes a slot 35 for receiving the lever 29 when the wheel assembly is retained in a raised position within the luggage case as shown in dotted lines. Referring again to FIGURE 3, it will be apparent that the area between the panels 20 and 21, as well as the area between the cross member 34 and the end of the luggage case, communicate with the exterior of the case for permitting the wheel assembly to pivot into and out of the lower portion of the luggage case.

Figure 4:
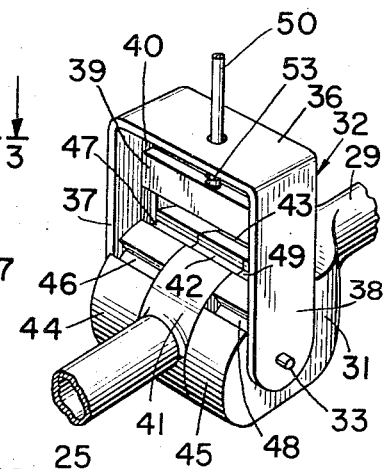
FIGURE 4 is a fragmentary perspective view of the means for coupling and locking the wheel assembly to a luggage case.

The details of the coupling assembly will be seen more clearly with reference now to FIGURE 4. The bracket 32 includes a top portion 36 and a pair of downwardly extending leg portions 37 and 38 which are adapted to be coupled to the panels 20 and 21 in the position shown in FIGURE 3. The leg portions 37 and 38 are spaced to receive the end portion 30 and the fork portion 31 of the levers 25 and 29 respectively. As above mentioned, the levers 25 and 29 are pivotally coupled to the bracket 32 by the pivot pin 33.

The coupling assembly includes means for locking the wheel assembly in the raised or retracted position shown in dotted lines in FIGURE 2, as well as in the lowered position shown in solid lines. Toward that end, and with reference to FIGURE 4, each of the leg portions 37 and 38 is provided with a vertical groove for slidably receiving a bar 39. One of the grooves is shown as 40 defined in the leg portion 37. It will be understood that the other groove is similarly defined in the leg portion 38 such that the bar 39 is vertically slidable within the bracket 32.

It will be seen in FIGURE 4 that the end portion 30 of the lever 25 includes a semi-cylindrical surface 41 in which are defined a pair of notches or grooves 42 and 43. Similarly, the fork portion 31 includes semi-cylindrical surfaces 44 and 45 disposed on opposite sides respectively of the surface 41. The surface 44 includes a pair of grooves 46 and 47 and the surface 45 includes a pair of grooves 48 and 49. The grooves 46 and 48 are defined in co-extensive or aligned relationship, as are the grooves 47 and 49.

A feature of the invention relates to a conveniently accessible means for actuating the locking means such that the wheel assembly is pivotable between the raised and lowered positions of FIGURE 2. Toward that end, an elongated rod 50 is secured to the top of the bar 39 and extends upwardly through the bracket 32, panel 22, and through the top of the luggage case 10 proximate to the handle 14. The top of the rod 50 is bent over as shown at 51 in FIGURES 1 and 2 to provide a means whereby the operator may lift the rod. The rod 50 may be hinged as shown at 52 in FIGURE 2 so that the rod may be disposed within the interior of the luggage case when not in use. As shown in FIGURE 4 a coil spring 53 is positioned around the rod 50 between the bar 39 and the bracket 32 for normally biasing the bar downwardly.

Figures 5, 6:
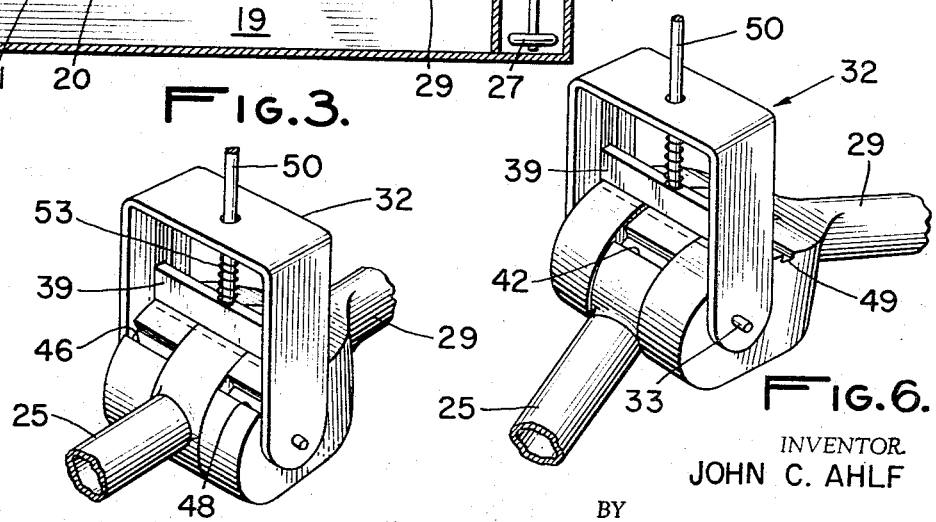
FIGURE 5 is a perspective view of the coupling and locking means of FIGURE 4 illustrating an operative position of same; and, FIGURE 6 is a perspective view of the coupling and locking means of FIGURE 4 further illustrating another operative position of the same.

In FIGURE 5 the bar 39 is shown received in the grooves 42, 47, and 48 of FIGURE 4 for locking the levers 25 and 29 in a position wherein the wheel assembly is retracted within the luggage case as shown in dotted lines in FIGURE 2. In FIGURE 6, the bar 39 is shown received in the grooves 43, 46, and 48 of FIGURE 4 upon pivoting of the levers 25 and 29 into a position wherein the wheel assembly is extended beneath the luggage case for supporting the same as shown in solid lines in FIGURE 2.

In operation, when it is desired to lower the wheel assembly to support the luggage case, the operator simply holds the luggage case above the floor or supporting surface and then raises the rod 50 by lifting the bent-over portion 51. This movement raises the bar 39 upwardly against the spring 53 as shown in FIGURE 4 thus freeing the levers 25 and 29 for pivoting downwardly by gravity to the lowered position shown in solid lines in FIGURE 2. As the levers pivot downwardly, the operator may release his grip on the rod 50, whereupon the spring 53 moves the bar downwardly for seating within the grooves 43, 46, and 48 when the same become aligned to lock the levers in the position of FIGURE 6. It will thus be seen that the wheel assembly will be automatically locked in the extended position for rollably supporting the luggage case. The provision of the castor type wheel 24 enables the operator to guide the luggage case easily in any desired direction by simply gripping the handle 14 as the operator walks alongside.

When it is desired to retract the wheel assembly within the luggage case, the rod 50 is again lifted to raise the bar 39 out of engagement with the grooves 43, 46, and 48. The luggage case is then simply lowered onto the supporting surface, thus pivoting the levers 25 and 29 upwardly until the wheel assembly is in the raised or retracted position shown in dotted lines in FIGURE 2. As the luggage case is being lowered, the rod 50 may be released whereupon the spring 53 moves the bar 39 downwardly such that when the grooves 42, 47, and 49 become aligned as in FIGURE 4, the bar 39 will be received therein for locking the levers in the position shown in FIGURE 5. It will thus be seen that the wheel assembly will be automatically locked in the retracted position in response to lowering the luggage case onto the floor or supporting surface.

From the foregoing it is apparent that the invention provides a simplified and compact arrangement characterized by ease of operation. The wheel assembly provides a stable support for the luggage case and permits the case to be easily guided along the supporting surface.

Various changes falling within the scope and spirit of the invention will occur to those skilled in the art. The invention is, therefore, not to be thought of as limited to the specific embodiment set forth.

What is claimed is:
1. A retractable wheel assembly for a luggage case comprising in combination: partition means dividing said luggage case into upper and lower portions; wheel means receivable in said lower portion; a generally U-shaped bracket secured within said lower portion of said luggage case, said wheel means including a pair of levers each having an end portion received within said bracket and secured thereto by means of a pivot pin for permitting pivoting movement of said wheel means between a raised position within said lower portion and a lowered position beneath said lower portion; locking means including a bar slidably mounted within said bracket, said end portions of said levers including notches defined therein for receiving said bar to accordingly lock said wheel means in their raised and lowered positions; and actuating means for said locking means for permitting said wheel means to pivot between said raised and lowered positions in response to operation of said actuating means.

2. The subject matter of claim 1, in which said actuating means includes an elongated rod coupled to said bar and upwardly extending through said luggage case and through the top thereof, whereby said bar may be raised out of said notches to permit said levers to pivot about said pivot pin in response to upward movement of said rod.

No references cited.

LEO FRIAGLIA, *Primary Examiner.*

J. SIEGEL, *Assistant Examiner.*